E. CORNELL.
Telegraph Wire.
No. 4,318. Patented Dec. 20, 1845.
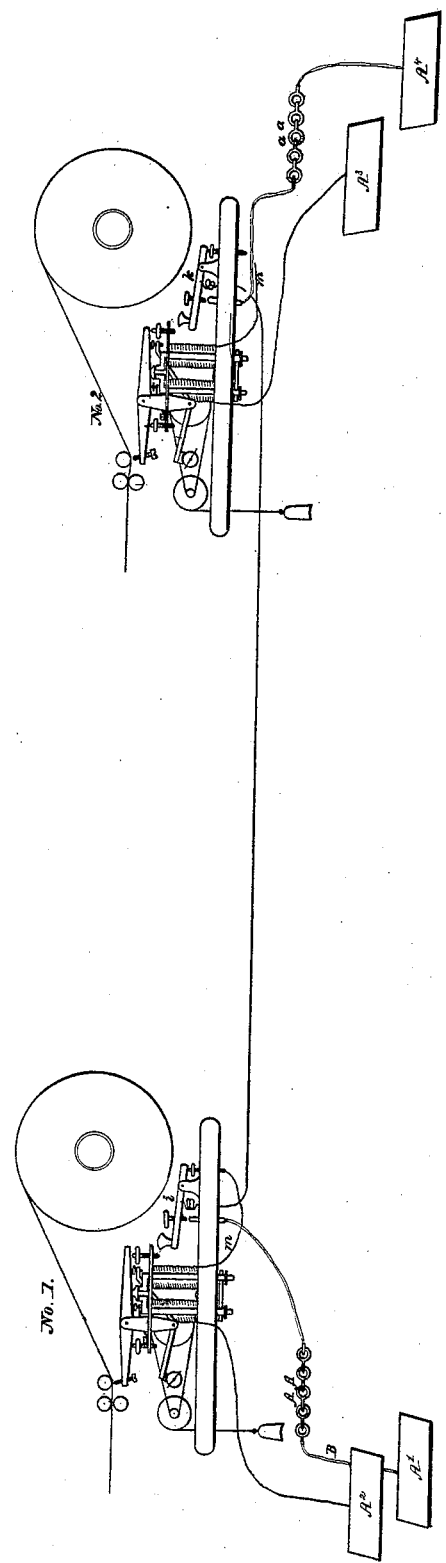

UNITED STATES PATENT OFFICE.

EZRA CORNELL, OF ITHACA, NEW YORK.

IMPROVEMENT IN THE MODE OF OPERATING ELECTRO-MAGNETIC TELEGRAPHS.

Specification forming part of Letters Patent No. 4,318, dated December 20, 1845.

*To all whom it may concern:*

Be it known that I, EZRA CORNELL, of Ithaca, in the county of Tompkins, in the State of New York, have invented a new and improved mode of adjusting and using metallic wire for telegraphic purposes, by which telegraph-instruments at opposite extremities of the same or of a single wire, or located at distant points on the same or a single wire, may be kept in constant readiness for use in conjunction with a galvanic battery, without the necessity of keeping the galvanic circuit closed when neither instrument is at work, and by which dependent circuits are avoided; and I do declare the following to be a full and exact description thereof, viz:

First, the figures or drawings herewith submitted, and numbered 1 and 2, represent Samuel F. B. Morse's telegraphic instrument or register.

Any other instrument that has been or may be used in connection with metallic conductors is equally as well adjusted to my invention, and may, for illustration, be represented in the place of the annexed drawings.

In the annexed drawings, $A'$ $A^2$ $A^3$ $A^4$ represent four copper plates buried in the ground, two at each point or extremity of the wire where telegraphic instruments or registers are to be used. Plates $A'$ and $A^4$ are severally connected by a metallic wire or conductor to one pole of a distinct galvanic battery, numbered A A and $a$ $a$. From the opposite pole of battery A A is a like conductor, that terminates in a point or button directly under the center of a metallic lever that is marked in Fig. 1 $i$. From a corresponding pole of battery $a$ $a$ is a like conductor, that in like manner terminates under the center of a like lever that is numbered in Fig. 2 $k$. The extreme right end of each lever, as represented, rests upon the point or termination of a metallic conductor that is marked $m$, and which in its extent forms the helix of the magnet in each instrument, and thence passes to and adjoins the copper plate $A^2$ in Fig. 1, and $A^3$ in Fig. 2. In the above position of said levers there is no contact of either with the metallic point described as beneath its center. Each lever rests upon a fulcrum between such center, and its extreme right end, before described. When the extreme left end of either lever is pressed down by the finger it is brought in contact with said central point beneath; but thereupon its extreme right end is lifted from a contact with the metallic point before described, and upon which its right extremity was before resting in contact. From near the center of each lever, on the under side, proceeds a metallic wire or conductor, the whole distance through which telegraphic communication is to be made, and connecting the two levers together. Said conductor is marked $h$.

With each lever at rest in the position represented by said figures it will be perceived that there is not from either battery, A A or $a$ $a$, a continuous metallic conductor, which, in conjunction with the earth, so connects the two poles as to produce the action of a galvanic current, and consequently both batteries are at rest or out of action. Thus tracing from plate $A'$ along the metallic conductor B through the battery A A, and thence along the before-described conductor that proceeds from the opposite pole, and there is a termination of the metallic conductor in the point beneath the center of the lever $j$. So tracing from plate $A^4$ in like manner along its metallic conductor to the battery $a$ $a$, and from the opposite pole along the adjunctive wire or conductor, and it terminates in the point beneath the center of lever $k$; but press the last-named lever down to a contact with the last described point beneath its center and the metallic conductor is made continuous from plate $A^4$ through battery $a$ $a$ and said point and lever $k$, and along the main conductor $h$ and along lever $i$, in Fig. 1, and the point with which the right extremity of that lever is in contact, and along the wire or conductor $m$ that forms the helix of the magnet of the instrument, Fig. 1, and thence by the conductor extending from said magnet to plate $A^2$ in the ground. The continuous metallic line thus formed by pressing the lever $k$ in contact with the central point beneath it puts the battery $a$ $a$ in instant action, and the galvanic current generated works the instrument at the distant point represented by Fig. 1. As soon as said lever $k$ ceases to be pressed into such contact the continuity of such line is destroyed, and the action of the battery is thereby instantly suspended. In the meantime, the lever $i$ not having been disturbed, the other battery has remained inactive; but on a similar pressure upon its lever $i$ with that described of lever $k$, and on contact of it with the central point beneath it, the continuous metallic line from plate $A'$ to plate $A^3$, through battery $A\ A$ and lever $i$, and the same main wire $h$ as in the former case, and lever $k$ and wire $m$, and the helix of the instrument in Fig. 2 is formed, and the battery $A\ A$ put into instantaneous action, and the magnet in Fig. 2 put in action. The contact of lever $i$ with the central point beneath it being broken the battery $A\ A$ is thereby again instantaneously suspended. By said arrangement only one wire need be used to work two instruments from opposite points, and the action, nevertheless, of all galvanic currents is suspended except when one of the instruments is in operation, and the operator of each instrument may thereby at all times command a galvanic current from the suspended battery to work the instrument at the point distant from him in a manner never before known or practiced.

What I claim as my invention, and desire to secure by Letters Patent, is—

The new and improved mode above described of arranging and adjusting metallic wires or other conductors to electro-magnetic and galvanic telegraph-instruments, by which instruments at opposite extremities of the same or of a single main wire, or located at distant points on the same main wire or a single wire, may be kept in constant readiness for use, in conjunction with a galvanic battery, without the necessity of keeping the galvanic circuit closed or the battery in action when neither instrument is at work, and by which the battery is put out of action instantly on the ceasing of the motion of the instrument, and in like manner is put into action immediately on commencing the motion of an instrument, and avoiding the disadvantage heretofore experienced in what have been denominated "dependent circuits" in the working of two or more telegraphic instruments over a single circuit of wire, or of wire and earth conjoined.

E. CORNELL.

Witnesses:
WM. C. R. ENGLISH,
H. WILSON.